United States Patent
Inomata (10) Patent No.: US 9,958,675 B2
(45) Date of Patent: May 1, 2018

(54) HEAD-UP DISPLAY APPARATUS

(71) Applicant: DENSO CORPORATION, Kariya, Aichi-pref. (JP)

(72) Inventor: Makoto Inomata, Handa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 59 days.

(21) Appl. No.: 14/783,955

(22) PCT Filed: Mar. 14, 2014

(86) PCT No.: PCT/JP2014/001456
§ 371 (c)(1),
(2) Date: Oct. 12, 2015

(87) PCT Pub. No.: WO2014/171060
PCT Pub. Date: Oct. 23, 2014

(65) Prior Publication Data
US 2016/0070099 A1    Mar. 10, 2016

(30) Foreign Application Priority Data
Apr. 18, 2013  (JP) .................. 2013-087752

(51) Int. Cl.
*G02B 27/14*    (2006.01)
*G02B 27/01*    (2006.01)
(Continued)

(52) U.S. Cl.
CPC .......... *G02B 27/0101* (2013.01); *B60K 35/00* (2013.01); *G02B 5/02* (2013.01); *G02B 2027/012* (2013.01); *G02B 2027/0118* (2013.01)

(58) Field of Classification Search
CPC .... G02B 2027/0136; G02B 2027/0141; G02B 2027/013; G02B 2027/194
(Continued)

(56) References Cited

U.S. PATENT DOCUMENTS 4,740,780 A * 4/1988 Brown .................. G02B 27/01 345/7
2003/0214724 A1* 11/2003 Fujikawa ........... G02B 27/0101 359/630
(Continued)

FOREIGN PATENT DOCUMENTS

JP    2000039581 A    2/2000
JP    2000249965 A    9/2000
(Continued)

OTHER PUBLICATIONS

International Search Report and Written Opinion (in Japanese with English Translation) for PCT/JP2014/001456, dated Apr. 15, 2014; ISA/JP.

*Primary Examiner* — Stephone B Allen
*Assistant Examiner* — Travis Fissel
(74) *Attorney, Agent, or Firm* — Harness, Dickey & Pierce, P.L.C.

(57) ABSTRACT

A combiner for a head-up display apparatus has: a front surface; a rear surface; a plurality of grooves formed in a stripe shape so as to penetrate between the front surface and the rear surface in an upper end section; and a plurality of reflective protrusions each formed between each groove in the upper end section. Each reflective protrusion: has a triangular cross section; extends between the front surface and the rear surface; forms a pair of planar reflective surfaces inclined relative to the horizontal plane as a result of interposing therebetween a vertical angle pointing upwards in the triangular cross section; and reflects light to the side by using the reflective surfaces. The angle of the vertical angle in each reflective protrusion gradually increases from either the front surface or the rear surface, towards the other.

10 Claims, 6 Drawing Sheets

(51) Int. Cl.
*B60K 35/00* (2006.01)
*G02B 5/02* (2006.01)

(58) Field of Classification Search
USPC .................................. 359/620–629, 638–640
See application file for complete search history.

(56) References Cited

U.S. PATENT DOCUMENTS

| | | | | |
|---|---|---|---|---|
| 2006/0092510 | A1* | 5/2006 | Imafuku | G03B 21/10 |
| | | | | 359/460 |
| 2009/0201589 | A1* | 8/2009 | Freeman | G02B 27/0103 |
| | | | | 359/630 |
| 2010/0073579 | A1 | 3/2010 | Okada et al. | |
| 2011/0234580 | A1* | 9/2011 | Wang | G02B 3/0043 |
| | | | | 345/418 |
| 2012/0176683 | A1 | 7/2012 | Rumpf et al. | |
| 2013/0050851 | A1* | 2/2013 | Machida | B29D 11/00269 |
| | | | | 359/742 |

FOREIGN PATENT DOCUMENTS

| | | |
|---|---|---|
| JP | 2005055663 A | 3/2005 |
| JP | 2010078860 A | 4/2010 |
| JP | 2010190599 A | 9/2010 |
| JP | 2012145902 A | 8/2012 |

\* cited by examiner

HEAD-UP DISPLAY APPARATUS

CROSS-REFERENCE TO RELATED APPLICATIONS

This application is a U.S. National Phase Application under 35 U.S.C. 371 of International Application No. PCT/JP2014/001456 filed on Mar. 14, 2014 and published in Japanese as WO 2014/171060 A1 on Oct. 23, 2014. This application is based on and claims the benefit of priority from Japanese Patent Application No. 2013-087752 filed Apr. 18, 2013. The entire disclosures of all of the above applications are incorporated herein by reference.

TECHNICAL FIELD

The present disclosure relates to a head-up display apparatus having a combiner that displays a virtual image of a display image, and displays the display image visible from a vehicle interior, in a vehicle having a window shield.

BACKGROUND ART

A head-up display apparatus has a combiner that is located in a vehicle, projects a display image to image a virtual image of a display image, and displays the image visible from a vehicle interior. For example, in a head-up display apparatus disclosed in patent literature 1, an upper end of the combiner is roughened by polishing or a rough mold inner surface. According to this configuration, an external light such as sunlight is diffused by the roughened upper end, and a reflection of the light in an observer's direction is prevented.

Generally, in the head-up display apparatus, an external light such as sunlight is input to the upper end of the combiner, and reflected from the upper end, and further reflected by a window shield, so that an occupant may visually recognize the virtual image of the upper. According to this difficulty, since the combiner upper end is viewed as a virtual image the display image displayed as the virtual image by the combiner, a forward visibility at the time of driving a vehicle may be deteriorated.

When the head-up display apparatus disclosed in patent literature 1 is studied, since an upper end of the combiner is roughened, the external light is diffused at random, and a part of the external light arrives at the window shield. As a result, the virtual image of the upper end can be viewed by the occupant.

PRIOR ART DOCUMENT

Patent Literature

Patent literature 1: JP 2003-39581 A

SUMMARY OF INVENTION

It is an object of the present disclosure to provide a head-up display apparatus enabling to prevent an upper end of a combiner from being viewed as a virtual image.

According to one example of the present disclosure, a head-up display apparatus includes a combiner imaging a virtual image of a display image and displaying the display image visible from an interior of a vehicle, in the vehicle having a window shield. The combiner includes: a front surface that faces forward in the vehicle; a rear surface that faces rearward in the vehicle; multiple grooves that have a stripe shape to penetrate between the front surface and the rear surface on an upper end of the combiner; and multiple reflective projections that are provided between the multiple grooves on the upper end. Each of the reflective projections extends between the front surface and the rear surface with a triangular cross section, provides a pair of planar reflective surfaces sloped from a horizontal plane, the pair of planar reflective surfaces sandwiching an apex angle pointed upward in the triangular cross section, and reflects light laterally by the planar reflective surfaces. An angle of the apex angle in each of the reflective projections gradually increases from one of the front surface and the rear surface toward the other of the front surface and the rear surface.

According to the head-up display apparatus, it may be possible to prevent the upper end of the combiner from being viewed as a virtual image.

According to another example of the present disclosure, a head-up display apparatus includes a combiner imaging a virtual image of a display image, and displaying the display image visible from an interior of a vehicle, in the vehicle having a window shield. The combiner includes: a front surface that faces forward in the vehicle; a rear surface that faces rearward in the vehicle; multiple grooves that have a stripe shape to penetrate between the front surface and the rear surface on an upper end of the combiner; and multiple reflective projections that are provided between the multiple grooves on the upper end. Each of the reflective projections extends between the front surface and the rear surface with a half-moon shaped cross section, forms a curved reflective surface sloped from a horizontal plane with an arc portion curved upward in the half-moon shaped cross section, and reflects light laterally by the curved reflective surface. Radius of curvature of the arc portion in each of the reflective projections gradually increases from one of the front surface and the rear surface toward the other of the front surface and the rear surface.

According to the head-up display apparatus, it may be possible to prevent the upper end of the combiner from being viewed as a virtual image.

BRIEF DESCRIPTION OF DRAWINGS

The above or other objects, configurations and advantages of this disclosure will become more apparent from the following detailed description with reference to the following drawings. In the drawings.

PREFERRED EMBODIMENTS FOR CARRYING OUT THE INVENTION

Embodiments of the present disclosure will be described with reference to the drawings. Incidentally, the identical reference numeral will be given to a corresponding component in each embodiment, and a redundant description will be omitted. When only a portion of a configuration is described in each embodiment, other configurations described in another embodiment are applied to the other portion of the configuration. In addition, a configuration specified in the description of each embodiment may be combined, and especially, a configuration of the multiple embodiments may be partially combined even though not specified herein so long as no difficulty occurs in the combination.

First Embodiment

Figure 1:
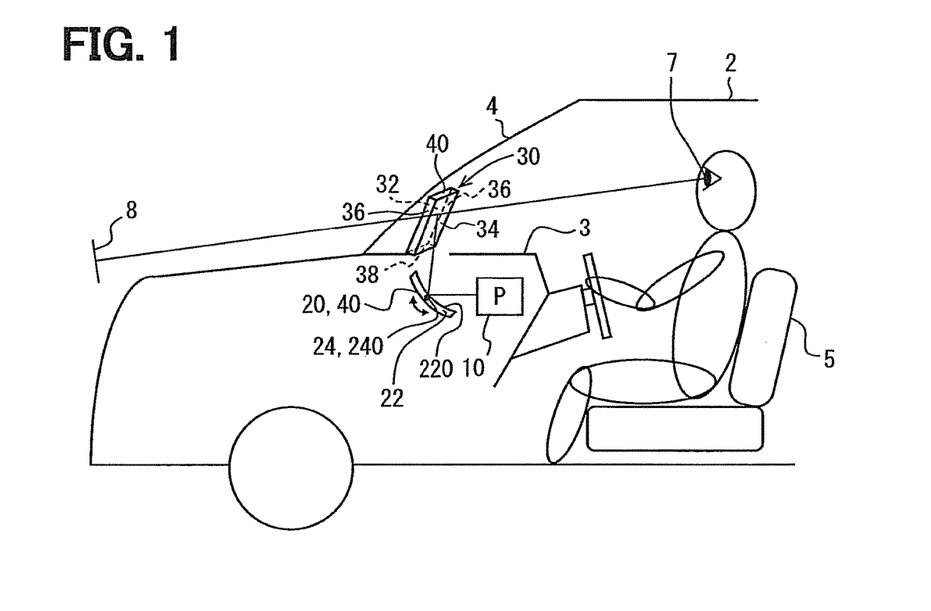
FIG. 1 is a diagram illustrating an installation state of a head-up display apparatus according to a first embodiment.

As illustrated in FIG. 1, a head-up display apparatus 1 according to a first embodiment of the present disclosure is installed in a vehicle 2, and housed in an instrument panel 3. The vehicle 2 has a window shield 4 in front of the instrument panel 3. The window shield 4 is made of, for example, transparent glass, and formed into a curved plate shape or a flat shape. The window shield 4 is disposed with a slope that allows an lower end of the window shield 4 to be in front of an upper end of the window shield 4. A driver's seat 5 and a passenger's seat 6 are arranged side by side in a lateral direction in the rear of the instrument panel 3. Occupants enable to seat facing forward.

The "front" in the present embodiment indicates a traveling direction of the vehicle 2. The "rear" indicates an opposite direction of the front. A "lower" indicates a direction of a ground on which the vehicle 2 travels. An "upper" indicates an opposite direction of the lower. A "right" indicates a direction of the driver's seat 5 side in the vehicle 2. A "left" indicates a direction of the passenger's seat 6 side in a case of a right-hand drive vehicle.

The head-up display apparatus 1 includes a projection part 10, a light guide part 20, and a combiner 30. The projection part 10 provides a liquid crystal projector illustrated in FIG. 2, and includes a backlight 12, a projection lens 14, and a liquid crystal panel 16. The backlight 12 includes a light source 120, a condenser lens 122, and a diffusion plate 124. The backlight 12 is housed in the interior of a support member 18.

Figure 2:
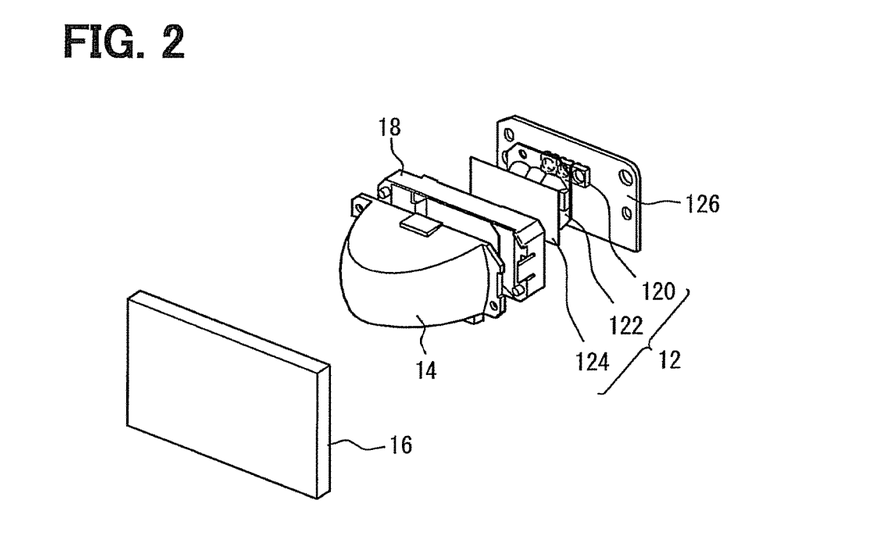
FIG. 2 is an exploded perspective view illustrating a configuration of a projection part according to the first embodiment.

The light source 120 includes a light emitting element such as a light emitting diode, and disposed to a light source circuit board 126. The light source 120 is electrically connected to a power supply (not shown) through a wiring pattern (not shown) on the light source circuit board 126. The light source 120 is supplied with electricity to emit a light, and projects a source light toward the condenser lens 122 as a light beam.

The condenser lens 122 is a transparent convex lens made of synthetic resin or glass, and disposed between the light source 120 and the diffusion plate 124. The condenser lens 122 has, for example, a plane formed as a surface of the light source 120 side, and a convex formed as a surface of the diffusion plate 124 side, so as to condense a source light from the light source 120, and project the light toward the diffusion plate 124.

The diffusion plate 124 is a translucent or milky white plate made of a synthetic resin such as polycarbonate into which a light diffusing material is mixed. The diffusion plate 124 is disposed between the condenser lens 122 and the projection lens 14. The diffusion plate 124 diffuses the source light from the condenser lens 122, to emit the source light adjusted in the uniformity of brightness toward the projection lens 14.

The projection lens 14 is a transparent convex lens made of a synthetic resin or glass, and disposed between the backlight 12 and the liquid crystal panel 16. The projection lens 14 has, for example, a plane formed as a surface of the backlight 12 side, and a convex formed as a surface of the liquid crystal panel 16 side, to condense the source light diffused by the diffusion plate 124, and project the light toward the liquid crystal panel 16.

The liquid crystal panel 16 is provided in such a manner that functional layers such as a liquid crystal layer are laminated on each other in a direction of projecting the source light, and disposed between the projection lens 14 and the light guide part 20. The liquid crystal panel 16 is, for example, a dot matrix TFT liquid crystal panel, and enables to project an image produced by multiple liquid crystal pixels arranged in two-dimensional directions. The projection part 10 projects the source light as the image toward the light guide part 20.

Incidentally, the projection part 10 may have another configuration that enables to project the image toward the light guide part 20. For example, the projection part 10 may be configured by an MEMS scanner projector using laser, or an organic EL projector.

As illustrated in FIG. 1, the light guide part 20 has a concave mirror 22 and a swinging part 24. The concave mirror 22 is provided in such a manner that aluminum as a reflective concave 220 is deposited to a surface of a substrate made of synthetic resin or glass. The reflective concave 220 has a smooth curved shape in which a central portion of the concave mirror 22 is concaved as a concave. Thus, the concave mirror 22 enables to enlarge and reflect a light beam of the source light. The light guide part 20 reflects the source light by the concave mirror 22, and guides the source light toward the combiner 30.

The concave mirror 22 is swingably driven about a swing axis 240 in a horizontal direction of the vehicle. Specifically, the concave mirror 22 has the swinging part 24 that is swingably driven about the swing axis 240 in the horizontal direction of the vehicle. The swinging part 24 swings the concave mirror 22 according to a drive signal from a controller electrically connected to the swinging part 24. With the swinging of the concave mirror 22, a projection position in the combiner 30 moves up and down, and an image formation position of a display image 8 is adjusted vertically.

Incidentally, the light guide part 20 may have another configuration that guides the source light toward the combiner 30. For example, another reflective mirror is provided, and an optical path of the source light may be bent to downsize the head-up display apparatus 1.

The combiner 30 has a plate shape made of a transparent synthetic resin or glass. The combiner 30 is disposed to the instrument panel 3 so as to be spaced from the concave mirror 22. The combiner 30 is disposed below the window shield 4 in the interior of the vehicle 2. The combiner 30, which is arranged as described above, has a front surface 32 that faces forward of the vehicle 2, and a rear surface 34 that faces rearward of the vehicle 2. The source light from the concave mirror 22 is reflected by the combiner 30 as a projection surface, and reaches an eye point 7 of an occupant who seats in the driver's seat 5. The occupant perceives the source light that reaches the eye point 7, and enables view the display image 8, which is a virtual image, in front of the combiner 30. Thus, the combiner 30 displays the display image 8 of the virtual image, and displays the image visible from the interior of the vehicle 2. The combiner 30 displays the display image 8 of the virtual image and displays the image visible, so that the occupant enables to perceive the image from the interior of the vehicle 2.

In the present embodiment, the front surface 32 and the rear surface 34 are macroscopically formed into a square having rounded corners. The front surface 32 and the rear surface 34 are disposed substantially in parallel to each other. The combiner 30 has a thickness of, for example, about 3 mm to 5 mm. Thus, an upper end 40 that faces upward, respective side ends 36 that face laterally, and a lower end 38 that faces downward are provided between the front surface 32 and the rear surface 34. The combiner 30 has the upper end 40, the side ends 36, and the lower end 38 between the front surface 32 and the rear surface 34. Incidentally, it may be preferable that the thickness of the combiner 30 is thinner taking an optical performance into account. However, since the combiner 30 may be deformed at the time of manufacture when the combiner 30 is too thin, the thickness is designed to these values.

Figure 3:
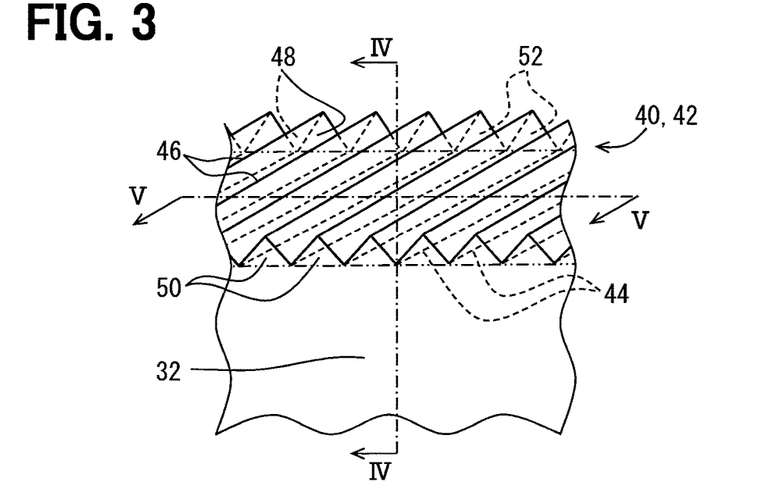
FIG. 3 is a perspective view illustrating a part of an upper end surface of a combiner according to the first embodiment.

A shape of the upper end 40 of the combiner 30 will be described in detail with reference to FIG. 3 to FIG. 7. As illustrated in FIG. 3, a stripe structure 42 having multiple grooves 44 and multiple reflective projections 46 is disposed over an entire area of the upper end 40. The multiple grooves 44 that penetrate through the front surface 32 and the rear surface 34 are formed into a stripe shape. The multiple reflective projections 46 that project upward are formed between the respective grooves 44. In the present embodiment, the respective grooves 44 are arranged substantially in parallel to each other, and all of intervals between the respective grooves 44 are designed to substantially a constant value. Each of the reflective projections 46 has a pair of reflective surfaces 48 each sloped from a horizontal plane, and formed in a plane. Each of the reflective projections 46 has a planar projection front surface 50 configuring a part of the front surface 32 and formed integrally with the other part of the front surface 32 without any boundary, and a planar projection rear surface 52 configuring a part of the rear surface 34 and formed integrally with the other part of the rear surface 34 without any boundary.

Figure 4:
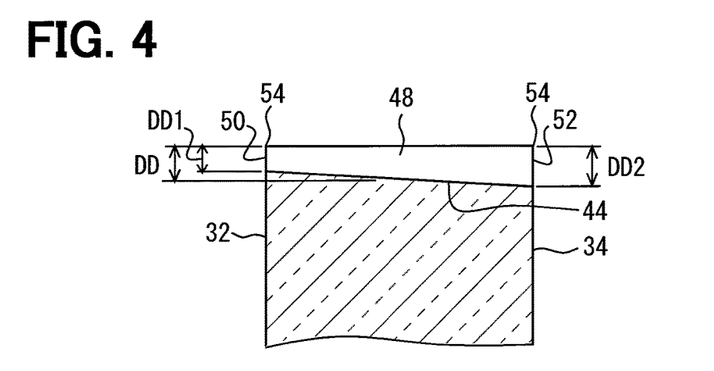
FIG. 4 is a cross-sectional view of the upper end surface of the combiner taken along a line IV-IV in FIG. 3.

FIG. 4 illustrates a cross section taken along the groove 44 and indicates a depth DD of the grooves 44. The depth DD of the grooves 44 is minimum on the projection front surface 50 side, and maximum on the projection rear surface 52 side. The depth DD gradually increases from the projection front surface 50 toward the projection rear surface 52 between the projection front surface 50 and the projection rear surface 52. Specifically, a maximum depth DD2 of the grooves 44 on the projection rear surface 52 side is designed to 50 μm or lower. In the present embodiment, the grooves 44 are formed obliquely to the horizontal plane. The grooves 44 may be formed in parallel to the horizontal plane.

Figure 5:
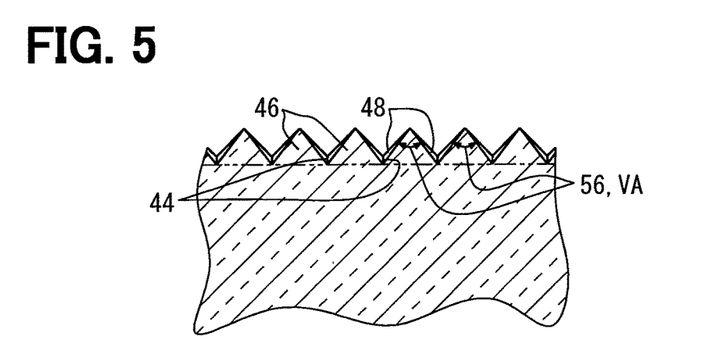
FIG. 5 is a cross-sectional view of the upper end surface of the combiner taken along a line V-V in FIG. 3.

FIG. 5 illustrates a cross section taken along a direction perpendicular to the groove 44, and illustrates a cross-sectional shape of the reflective projections 46. The reflective projections 46 each have a triangular cross section. In more detail, the reflective projections 46 has a cross section of an isosceles triangle. The cross section of the reflective projections 46 has an apex angle 56 pointed upward that is sandwiched between a pair of reflective surfaces 48 forming isosceles. The pair of reflective surfaces 48 forming isosceles sandwiches the apex angle 56. As illustrated in FIG. 3, the reflective projections 46 each extend between the front surface 32 and the rear surface 34 with a triangular cross section.

Figure 6A:
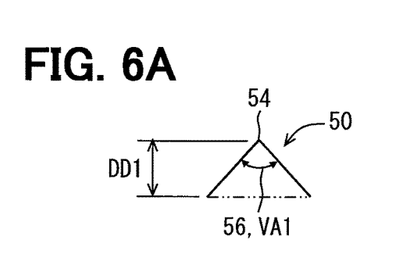
FIG. 6A is a diagram illustrating a shape of a projection front surface of the combiner.
Figure 6B:
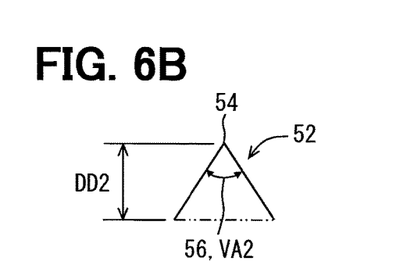
FIG. 6B is a diagram illustrating a shape of a projection rear surface of the combiner.

As illustrated in FIG. 6A and FIG. 6B, the projection front surface 50 and the projection rear surface 52 in the present embodiment are formed into an isosceles triangle. In detail, the projection front surface 50 and the projection rear surface 52 are designed to different shapes. An angle VA1 of the apex angle 56 at a vertex 54 of the isosceles triangle in the projection front surface 50 is designed to be smaller than an angle VA2 of the apex angle 56 at the vertex 54 of the isosceles triangle in the projection rear surface 52. For example, the angle VA1 of the apex angle 56 is designed to 100 degrees, and the angle VA2 of the apex angle 56 is designed to 80 degrees. In the cross section between the projection front surface 50 and the projection rear surface 52, with a gradual increase in the depth DD of the grooves 44 toward the projection rear surface 52 from the projection front surface 50, the angle VA of the apex angle 56 of each reflective projection 46 gradually decreases. For example, at a midpoint between the vertex 54 of the projection front surface 50 and the vertex 54 of the projection rear surface 52, the angle VA of the apex angle 56 is designed to 90 degrees, which is an intermediate value between the angle VA1 and the angle VA2.

When the combiner 30 is manufactured by molding, it is considered that a punching die sliding in a longitudinal direction is used for the upper end 40. However, in the cross section between the projection front surface 50 and the projection rear surface 52, the punching die slides in the longitudinal direction without forcedly punching due to the stripe structure 42. In the stripe structure 42, the depth DD of the grooves 44 gradually increases from the projection front surface 50 toward the projection rear surface 52, so that the angle VA of the apex angle 56 of each reflective projection 46 gradually decreases.

Figure 7:
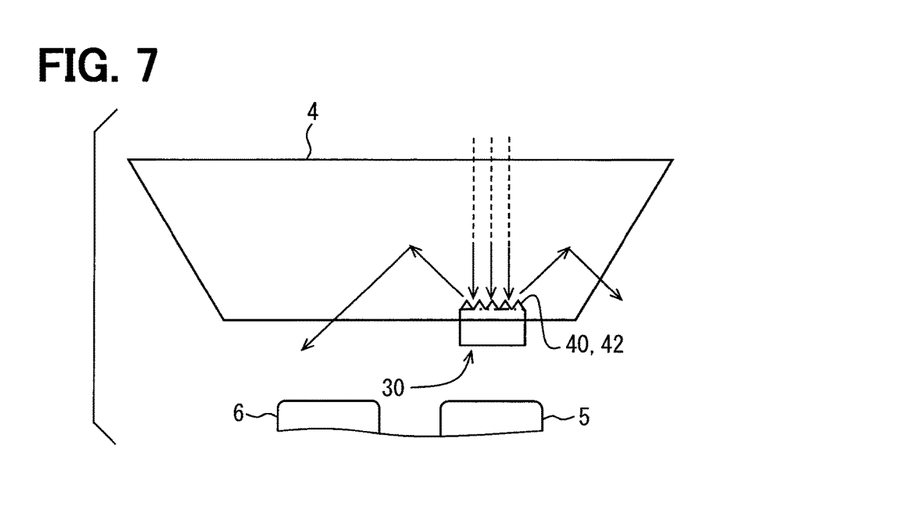
FIG. 7 is a diagram illustrating an outline of a control of an external light to be input to the upper end surface of the combiner according to the first embodiment.

A control of an external light input to the upper end 40 having the reflective surfaces 48 in which the apex angle 56 of each reflective projection 46 changes three-dimensionally will be described. As illustrated in FIG. 7, the external light is, for example, sunlight, and input to the upper end 40 of the combiner 30 through the window shield 4. When the upper end 40 has a planar shape, the external light is reflected upward as it is, further reflected by the window shield 4, and reaches the eye point 7 of the occupant. Then, the upper end 40 of the combiner 30 may be viewed as the virtual image from the interior of the vehicle 2. In the present embodiment, the input external light is reflected laterally in the vehicle 2 due to the shape of the upper end 40.

Figures 8A, 8B:
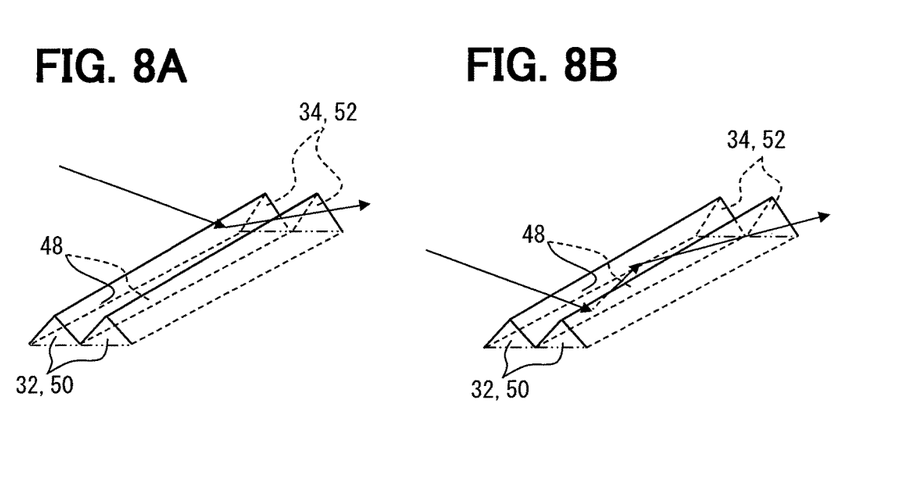
FIG. 8A is a diagram illustrating an example of one reflection of the external light according to the first embodiment.
FIG. 8B is a diagram illustrating an example of two reflections of the external light according to the first embodiment.

FIG. 8A and FIG. 8B illustrate an example of the external light reflected laterally. The external light illustrated as an example of one reflection in FIG. 8A is input to the upper end 40 through the window shield 4. Specifically, the external light is input obliquely to the reflective surfaces 48 of the reflective projections 46 from a front upper side. Since the reflective surfaces 48 of the reflective projections 46 have a slope from the horizontal plane due to the apex angle 56, the external light is reflected, for example, rearward and laterally according to a reflection rule. Further, the reflected light passes between the respective reflective projections 46, and advances rearward and laterally of the combiner 30 as it is.

When the external light is input to a relatively front side of the reflective surfaces 48, or input to a vicinity of the grooves 44, the external light may be reflected twice by the upper end 40. The external light illustrated as an example of two reflections in FIG. 8B is input to the relatively front side of the reflective surfaces 48 of the reflective projections 46. Similar to a case of one reflection, the external light is reflected by the reflective surfaces 48 having the slope from the horizontal plane, for example, rearward and laterally. In this case, the external light does not pass between the respective reflective projections 46, and is reflected again by a relatively rear side of the adjacent reflective surfaces 48. Since the second reflection portion has a steeper slope from the horizontal plane than that of the first reflection portion due to a change in the apex angle 56, the external light changes from the advancing direction after reflection, and is reflected toward the rear upper and lateral side.

Since the external light reflected laterally further advances laterally even when the external light is reflected by the window shield 4, the external light hardly reaches the eye point 7 of the occupant. Therefore, the upper end 40 of the combiner 30 is prevented from being viewed as the virtual image from the interior of the vehicle 2.

Figure 9:
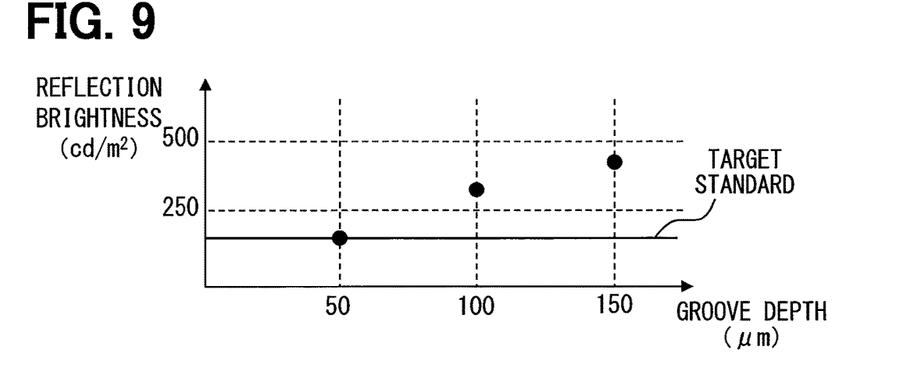
FIG. 9 is a diagram illustrating a relationship between the depth of grooves and a reflection brightness according to the first embodiment.

A relationship between the depth DD of the grooves 44 and the brightness of the virtual image of the upper end 40 will be described. A graph illustrated in FIG. 9 illustrates results obtained by preparing multiple combiners having the upper end 40 different in the depth DD of the grooves 44, and investigating the influence on the brightness of the virtual image of the upper end 40. In the investigation, the upper end 40 is irradiated with light from an experimental light source (about 100,000 lx in illuminance) assuming the external light as a pseudo sunlight from the outside of the vehicle 2, a luminance meter is arranged at a portion corresponding to the eye point 7, and the brightness (hereinafter referred to as "reflection brightness") of the light that reaches the portion corresponding to the eye point 7 from the direction of the window shield 4 is measured. According to the investigation, the reflection brightness is about 400 $cd/m^2$ when the depth DD of the grooves 44 is 150 µm at the maximum, the reflection brightness is about 300 $cd/m^2$ when the depth DD of the grooves 44 is 100 µm at the maximum, and the reflection brightness is about 150 $cd/m^2$ when the depth DD of the grooves 44 is 50 µm at the maximum. In other words, when the depth DD of the grooves 44 is smaller, the reflection brightness also tends to decrease. When the depth DD of the grooves 44 is equal to or lower than 50 µm at the maximum, a target standard that the reflection brightness is equal to or lower than 150 $cd/m^2$ set as a condition where the occupant is not anxious is achieved.

A relationship between the depth DD of the grooves 44 and an appearance of the upper end will be described. The depth DD of the grooves 44 according to the present embodiment is 50 µm at the maximum. When the depth DD of the grooves 44 is equal to or lower than 100 µm, the reflective projections 46 are hardly viewed from the viewpoint of the appearance when the upper end 40 of the combiner 30 is directly viewed. Specifically, a surface of the upper end 40 is viewed in a planar shape such as frosted glass. When the upper end 40 is directly viewed obliquely, when the depth DD of the grooves 44 is large, the reflective surfaces 48 that shine brightly may be viewed. According to the design of the depth DD of the grooves 44 in the present embodiment, since a surface area of the reflective surfaces 48 is reduced, this phenomenon may be reduced.

According to the first embodiment, in the combiner 30, the multiple stripe-like grooves 44 are defined in the upper end 40 so as to penetrate between the front surface 32 facing forward and the rear surface 34 facing rearward in the vehicle 2. In the combiner 30, the reflective projections 46 formed between the respective grooves 44 extend between the front surface 32 and the rear surface 34 with the triangular cross section. Thus, in the respective reflective projections 46, the external light input to the upper end 40 of the combiner is reflected laterally by the pair of the planar reflective surfaces 48 sloped from the horizontal plane. Thus, according to this configuration, in the window shield 4, it may be possible that an area at which the reflective external light by the respective upper end 40 arrives is removed from an area in which the upper end 40 of the combiner is viewed as the visual image by the arrival.

The reflective surfaces 48 of the respective reflective projections 46 are provided into the pair of planar shapes between which the apex angle pointed upward in the triangular cross section is sandwiched. Therefore, it may be possible to exert the function of reflecting the external light laterally at an arbitrary portion. It may be possible to prevent the virtual image of the upper end 40 of the combiner from being viewed. The apex angle gradually increases the angle from one of the front surface 32 and the rear surface 34 toward the other surface in the respective reflective projections. According to the respective reflective surfaces 48 on both sides of the grooves 44 among the reflective surfaces 48 between which the apex angle is sandwiched, inclination angles of the reflective surfaces 48 are different from each other between a first reflection portion to the input external light from the front upper side and the subsequent reflection portion. According to the difference of the inclination angles, the function of reflecting the external light laterally may be enhanced, and it may be possible to surely exert the visibility suppression effect as the virtual image of the upper end 40 of the combiner.

According to the first embodiment, when the maximum value of the depth of the grooves 44 is equal to or lower than 50 µm, the reflection brightness by the reflective surfaces 48 on both sides of each groove 44 is reduced. It may be possible to enhance the visibility suppression effect as the virtual image of the upper end of the combiner. When the maximum value of the depth DD of the grooves 44 is equal to or lower than 50 µm, when the occupant directly views the upper end 40 of the combiner, it may be possible prevent the stripe structure 42 from being viewed as a real image.

According to the first embodiment, in the upper end 40 of the combiner where the stripe structure 42 is disposed over the entire area, the function of reflecting the external light laterally may be exerted on an arbitrary portion. According to this configuration, it may be possible to prevent the entire area of the upper end 40 of the combiner from being viewed as the virtual image.

Second Embodiment

A combiner 30 according to a second embodiment of the present disclosure will be described with reference to the drawings.

Figure 10:
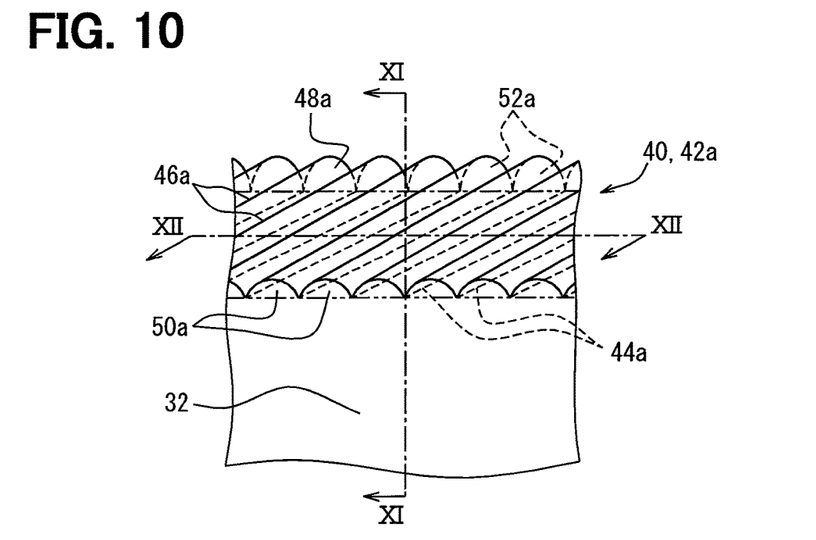
FIG. 10 is a perspective view illustrating a part of an upper end surface of a combiner according to a second embodiment.

A shape of the upper end 40 of the combiner 30 will be described. As illustrated in FIG. 10, a stripe structure 42a having multiple grooves 44a and multiple reflective projections 46a is disposed over an entire area of the upper end 40. Each of the reflective projections 46a according to this embodiment has one reflective surface 48a sloped from a horizontal plane, and formed into a curved shape. Each of the reflective projections 46a has a planar projection front surface 50a configuring a part of the front surface 32 and formed integrally with the other part of the front surface 32 without boundary, and a planar projection rear surface 52a configuring a part of the rear surface 34 and formed integrally with the other part of the rear surface 34 without boundary.

Figure 11:
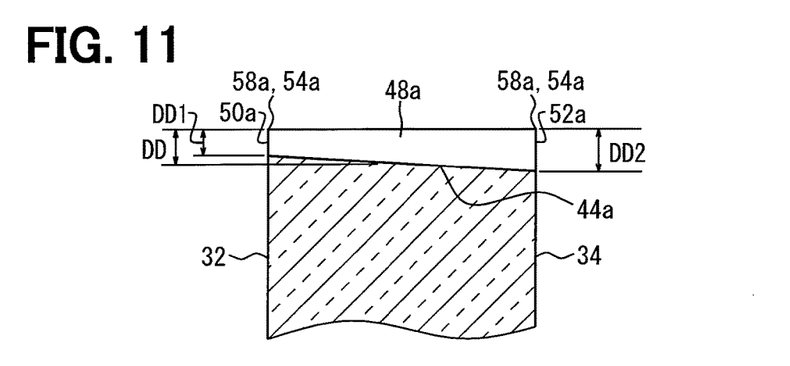
FIG. 11 is a cross-sectional view of the upper end surface of the combiner taken along a line XI-XI in FIG. 10.

As illustrated in FIG. 11, as in the first embodiment, the depth DD of the grooves 44 is minimum on the projection front surface 50a side, and maximum on the projection rear surface 52a side, and the depth DD gradually increases from the projection front surface 50a toward the projection rear surface 52a between the projection front surface 50a and the projection rear surface 52a. In the present embodiment, for example, a maximum depth DD2 of the grooves 44a on the projection rear surface 52a side is designed to 50 μm. A minimum depth DD1 of the grooves 44a on the projection front surface 50a side is designed to a range of from 20 to 30 μm.

Figure 12:
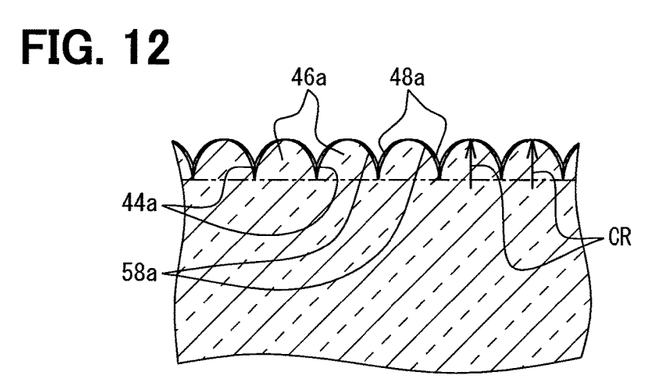
FIG. 12 is a cross-sectional view of the upper end surface of the combiner taken along a line XII-XII in FIG. 10.

As illustrated in FIG. 12, the reflective projections 46a according to the present embodiment have a half-moon shaped cross section in which an arc portion 58a is curved upward.

Figure 13A:
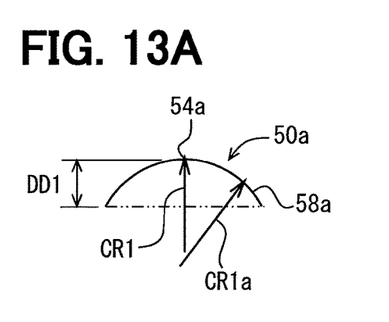
FIG. 13A is a diagram illustrating a shape of a projection front surface of the combiner.
Figure 13B:
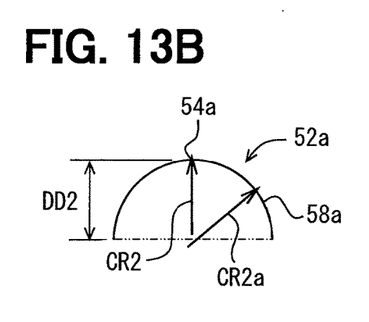
FIG. 13B is a diagram illustrating a shape of a projection rear surface of the combiner.

As illustrated in FIG. 13A and FIG. 13B, the projection front surface 50a and the projection rear surface 52a in the present embodiment provide the half-moon shape in which the arc portion 58a is curved. As in the first embodiment, the projection front surface 50a and the projection rear surface 52a are designed to different shapes. A radius of curvature CR1 at vertex 54a of the arc portion 58a in the projection front surface 50a is larger than a radius of curvature CR2 at the vertex 54a of the arc portion 58a in the projection rear surface 52a. For example, the radius of curvature CR2 is equal to or lower than 50 μm which is the depth DD or lower of the corresponding groove 44a. The radius of curvature CR1 is larger than 50 μm. In the cross section between the projection front surface 50a and the projection rear surface 52a, with a gradual increase in the depth DD of the grooves 44a toward the projection rear surface 52a from the projection front surface 50a, the radius of curvature CR at the vertex 54a of each reflective projection 46a gradually decreases. The arc portion 58a according to this embodiment is not arc. The arc portion 58a has a curved shape in which radii of curvature CR1a and CR2a gradually increase more toward the grooves as compared with the radii of curvature CR1 and CR2 at the respective vertices 54a.

Figure 14A:
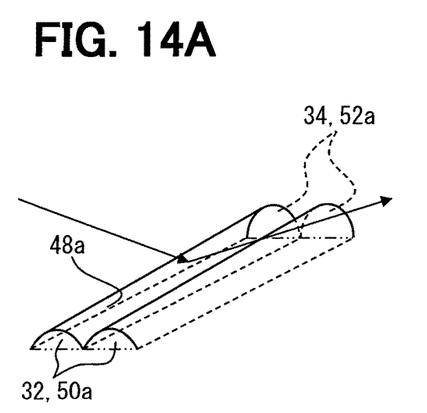
FIG. 14A is a diagram illustrating an example of one reflection according to the second embodiment.
Figure 14B:
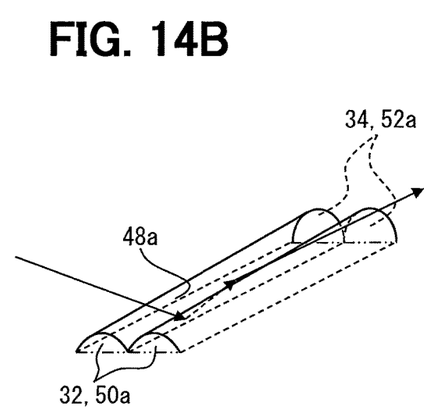
FIG. 14B is a diagram illustrating an example of two reflections according to the second embodiment.

A control of an external light input to the upper end 40 having the reflective surfaces 48a in which the radius of curvature changes three-dimensionally will be described. FIG. 14A and FIG. 14B illustrate examples of the external light reflected laterally. The external light illustrated as an example of one reflection in FIG. 14A is input to the upper end 40 through the window shield 4. Specifically, the external light is input obliquely to the reflective surfaces 48a of the reflective projections 46a from a front upper side. Since the reflective surfaces 48a of the reflective projections 46a have a slope from the horizontal plane due to the arc portion 58a, the external light is reflected, for example, toward the rear upper and lateral side according to a reflection rule.

When the external light is input to a relatively front side of the reflective surfaces 48a, or input to the vicinity of the grooves 44a, the external light may be reflected twice by the upper end 40. The external light illustrated as an example of two reflections in FIG. 14B is input to the vicinity of the grooves 44a of the reflective surfaces 48a of the reflective projections 46a. The external light is reflected, for example, laterally by the reflective surfaces 48a having the slope from the horizontal plane. The external light is reflected again by the other of the reflective surfaces 48a of both sides of the groove 44a sandwiched between the reflective surfaces 48a. Since the second reflection portion has a steeper slope from the horizontal plane than the first reflection portion due to a change in the radius of curvature CR, the external light changes from the advancing direction after reflection, and is reflected toward the rear upper side and the lateral side.

According to the second embodiment, in the combiner 30, the multiple stripe-like grooves 44a are defined in the upper end 40 so as to penetrate between the front surface 32 facing forward and the rear surface 34 facing rearward in the vehicle 2. In the combiner 30, the reflective projections 46a formed between the respective grooves 44a extend between the front surface 32 and the rear surface 34 with the half-moon shaped cross section. In the respective reflective projections 46a, the external light input to the upper end 40 of the combiner is reflected laterally by the curved reflective surface 48a sloped from the horizontal plane due to the upward curvature of the arc portion 58a in the half-moon shaped cross section. According to this configuration, in the window shield 4, it may be possible to remove an area at which the reflective external light by the respective reflective projections 46a arrives from an area in which the upper end 40 of the combiner is viewed as the visual image by the arrival.

The reflective surfaces 48a gradually increase the radius of curvature CR from one of the front surface 32 and the rear surface 34 toward the other surface in the respective reflective projections 46a. According to the respective reflective surfaces 48a on both sides of the grooves 44a among the reflective surfaces 48a, inclination angles of the reflective surfaces 48a are different from each other between a first reflection portion to the input external light from the front upper side and the subsequent reflection portion. According to the difference of the inclination angles, the function of reflecting the external light laterally may be enhanced, and it may be possible to surely exert the visibility suppression effect as the virtual image of the upper end 40 of the combiner.

According to the reflective surfaces 48a of the respective reflective projections 46a in the second embodiment, the curved arc portion 58a in which the radius of curvature gradually increases toward the grooves from the vertex 54a is smaller in the radius of curvature of the vertex by the same depth DD of the groove 44a than that of the arc curved shape in which the radius of curvature is constant. According to the configuration, since the slope from the horizontal plane is given to the vicinity of the vertex 54a in the reflective surfaces 48a of the respective reflective projections 46a, it may be possible to enlarge a portion in which the function of reflecting the external light laterally can be exerted as much as possible, and it may be possible to prevent the visibility as the virtual image of the upper end 40 of the combiner.

According to the second embodiment, when the maximum value of the depth DD of the grooves 44a is equal to or lower than 50 μm, the reflection brightness by the reflective surfaces 48a on both sides of each groove 44a is reduced. It may be possible to enhance the visibility suppression effect as the virtual image of the upper end 40 of the combiner. When the maximum value of the depth DD of the grooves 44a is equal to or lower than 50 μm, when the occupant directly views the upper end 40 of the combiner, it may be possible to prevent the stripe structure 42a from being viewed as a real image.

According to the second embodiment, in the upper end 40 of the combiner where the stripe structure 42a is provided over the entire area, it may be possible to exert the function of reflecting the external light laterally at an arbitrary portion. According to this configuration, it may be possible to prevent the entire area of the upper end 40 of the combiner from being viewed as the virtual image.

Other Embodiments

Embodiments of the present disclosure have been described. The present disclosure should not be construed as being limited to the embodiments and is applied to various embodiments and combination without departing from the scope of the disclosure.

Figure 15:
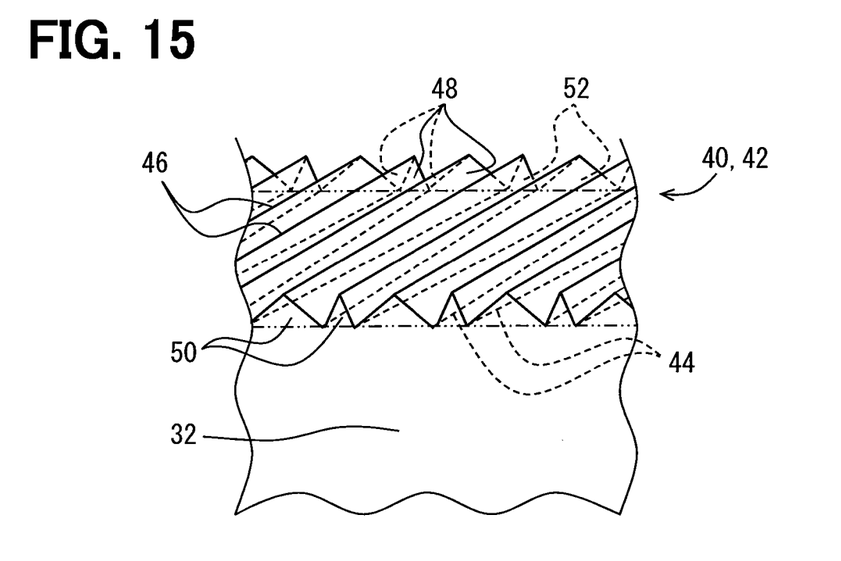
FIG. 15 is a perspective view illustrating a part of an upper end surface of a combiner according to a first modification.

In a first modification, as illustrated in FIG. 15, grooves 44 are formed into a stripe shape. The reflective projections 46 that project upward are provided between the respective grooves 44. In this example, the grooves 44 are not substantially in parallel to each other, and alternately arranged at different angles to the front surface 32 or the rear surface 34. The reflective projections 46 having the angle VA of the apex angle 56 that gradually increases toward the projection rear surface 52 from the projection front surface 50, and the reflective projections 46 in which the angle VA of the apex angle 56 gradually increases toward the projection front surface 50 from the projection rear surface 52 are mixed together, and alternately arranged. Even according to this configuration, the effects conforming to the first embodiment may be obtained.

In a second modification, the depths DD of the grooves 44, 44a may be maximal on the projection front surfaces 50, 50a side, and minimum on the projection rear surfaces 52, 52a side. The depths DD may gradually decrease from the projection front surfaces 50, 50a toward the projection rear surfaces 52, 52a between the projection front surfaces 50, 50a and the projection rear surfaces 52, 52a. In this example, for example, in the cross section of the reflective projections 46a, with a gradual decrease in the depth DD of the grooves 44 toward the projection rear surface 52 from the projection front surface 50, the angle VA of the apex angle 56 of each reflective projection 46 may gradually increase.

In a third modification, the stripe structures 42, 42a may be provided on, not only the upper end 40, but also at least one of the side end 36 and the lower end 38.

In a fourth embodiment, an angle difference between the angle VA1 and the angle VA2 may be about 1 to 2 degrees when the reflective surfaces 48 in which the apex angles 56 of the reflective projections 46 change three-dimensionally are provided.

In a fifth modification, in the arc portion 58a, the radius of curvature may be held constant or gradually decreased toward the grooves 44a to the radius of curvature CR at the vertex 54a. For example, the arc portion 58a may be a circular arc.

In a sixth modification, the depths DD of the grooves 44, 44a may be equal to or greater than 50 μm.

In a seventh modification, the stripe structures 42, 42a may be provided on a part of the upper end 40.

In an eighth modification, the present disclosure may be applied to various mobile bodies (a transportation equipment) such as vessel, aircraft other than the vehicle 2.

In a ninth modification, the grooves 44, 44a may be provided in parallel to the horizontal plane.

What is claimed is:

1. A head-up display apparatus comprising:
a combiner imaging a virtual image of a display image and displaying the display image visible from an interior of a vehicle, in the vehicle having a window shield, wherein
the combiner includes:
a front surface that faces forward in the vehicle;
a rear surface that faces rearward in the vehicle;
a plurality of grooves that are disposed in parallel with each other, and penetrate between the front surface and the rear surface on an upper end of the combiner;
a plurality of reflective projections that are provided between the plurality of grooves on the upper end;
a predetermined thickness;
a thickness direction of the combiner corresponds to a direction perpendicular to the front surface and the rear surface;
the plurality of grooves and the plurality of reflective projections are provided at an end surface of the combiner; and
each of the reflective projections extends between the front surface and the rear surface by extending in the thickness direction,
each of the reflective projections
extends between the front surface and the rear surface with a triangular cross section,
provides a pair of planar reflective surfaces sloped from a horizontal plane, the pair of planar reflective surfaces sandwiching an apex angle pointed upward in the triangular cross section, and
reflects light laterally by the planar reflective surfaces toward a direction of a width of the vehicle, and
an angle of the apex angle in each of the reflective projections gradually increases from one of the front surface and the rear surface toward an other of the front surface and the rear surface.

2. The head-up display apparatus according to claim 1, wherein
a depth of each of the grooves is equal to or lower than 50 μm.

3. The head-up display apparatus according to claim 1, wherein
a stripe structure having the plurality of the grooves and the plurality of the reflective projections is arranged in an overall region of the upper end.

4. The head-up display apparatus according to claim 1, wherein:
the combiner is arranged on a line of connecting an eye point of an occupant seating on a driver seat of the vehicle and the virtual image of the display image.

5. The head-up display apparatus according to claim 1, wherein the predetermined thickness of the combiner is about 3 mm to 5 mm.

6. The head-up display apparatus according to claim 1, wherein
each of the reflective projections extends between the front surface and the rear surface having an isosceles triangular shaped cross section.

7. A head-up display apparatus comprising:
a combiner imaging a virtual image of a display image, and displaying the display image visible from an interior of a vehicle, in the vehicle having a window shield, wherein
the combiner includes:
a front surface that faces forward in the vehicle;
a rear surface that faces rearward in the vehicle;
a plurality of grooves that are disposed in parallel with each other, and penetrate between the front surface and the rear surface on an upper end of the combiner; and
a plurality of reflective projections that are provided between the plurality of grooves on the upper end,
each of the reflective projections
extends between the front surface and the rear surface with a half-moon shaped cross section,
forms a curved reflective surface sloped from a horizontal plane with an arc portion curved upward in the half-moon shaped cross section, and
reflects light laterally by the curved reflective surface toward a direction of a width of the vehicle, and
radius of curvature of the arc portion in each of the reflective projections gradually increases from one of the front surface and the rear surface toward an other of the front surface and the rear surface.

8. The head-up display apparatus according to claim 7, wherein
the arc portion has a curved line having a radius of curvature gradually increasing toward one of the grooves from a vertex of the arc portion.

9. The head-up display apparatus according to claim 7, wherein
a depth of each of the grooves is equal to or lower than 50 µm.

10. The head-up display apparatus according to claim 7, wherein
a stripe structure having the plurality of the grooves and the plurality of the reflective projections is arranged in an overall region of the upper end.

* * * * *